No. 852,146. PATENTED APR. 30, 1907.
O. SUTTON.
VEHICLE TOP.
APPLICATION FILED JUNE 28, 1906.

2 SHEETS—SHEET 1.

Witnesses
Phil. E. Barnes
John F. Byrne

Inventor
Oscar Sutton
By Victor J. Evans
Attorney

No. 852,146. PATENTED APR. 30, 1907.
O. SUTTON.
VEHICLE TOP.
APPLICATION FILED JUNE 28, 1906.
2 SHEETS—SHEET 2.
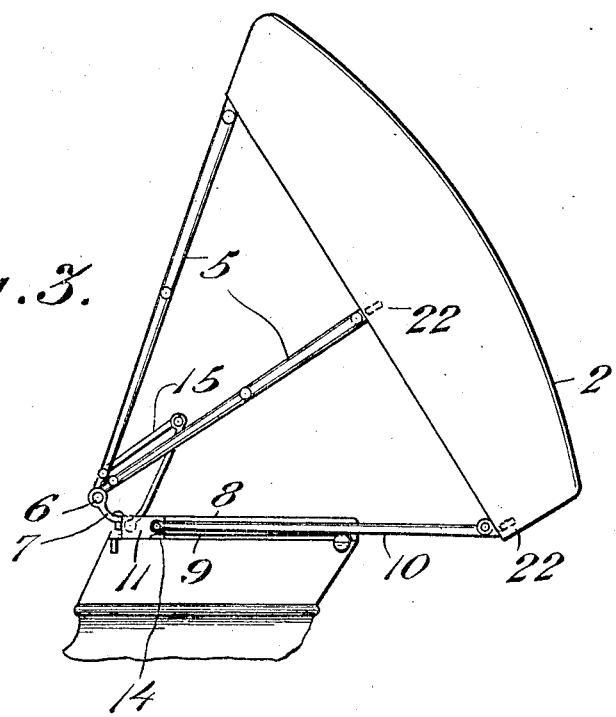
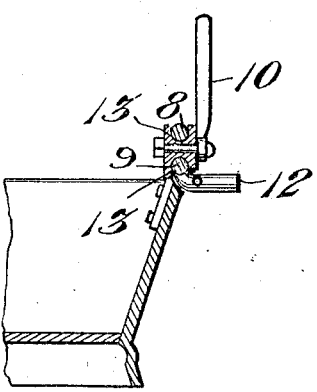
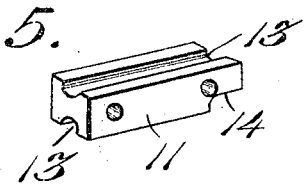
Witnesses
Phil E. Barnes
John F. Byrne
Inventor
Oscar Sutton.
By Victor J. Evans
Attorney

UNITED STATES PATENT OFFICE.

OSCAR SUTTON, OF GOLDSBORO, NORTH CAROLINA.

VEHICLE-TOP.

No. 852,146.  Specification of Letters Patent.  Patented April 30, 1907.

Application filed June 28, 1906. Serial No. 323,829.

*To all whom it may concern:*

Be it known that I, OSCAR SUTTON, a citizen of the United States, residing at Goldsboro, in the county of Wayne and State of North Carolina, have invented new and useful Improvements in Vehicle-Tops, of which the following is a specification.

My invention relates to vehicle tops, and its primary object is to provide a novel and highly useful means by which the top may be easily and quickly lowered and raised.

A further object is to provide a vehicle top which is constructed to permit a mail carrier to "route" mail boxes from the vehicle without lowering the top.

Figure 1:
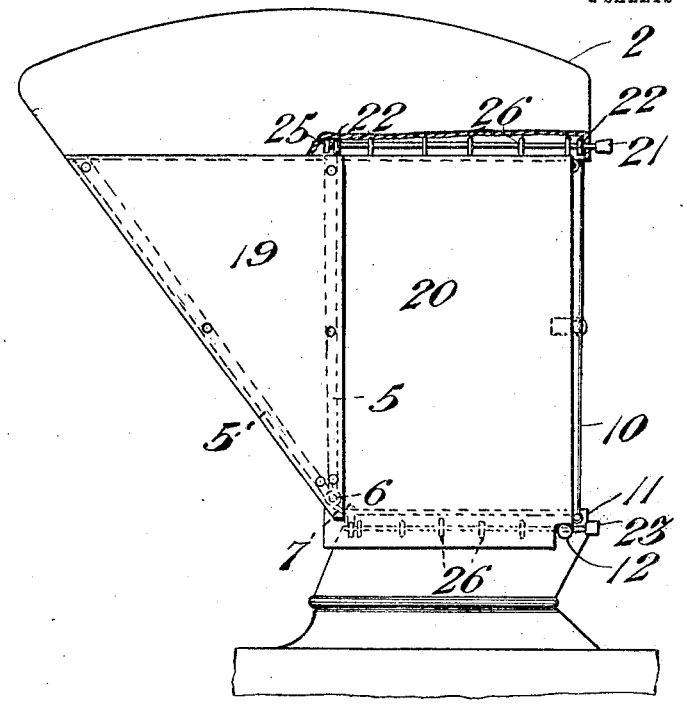
Figure 2:
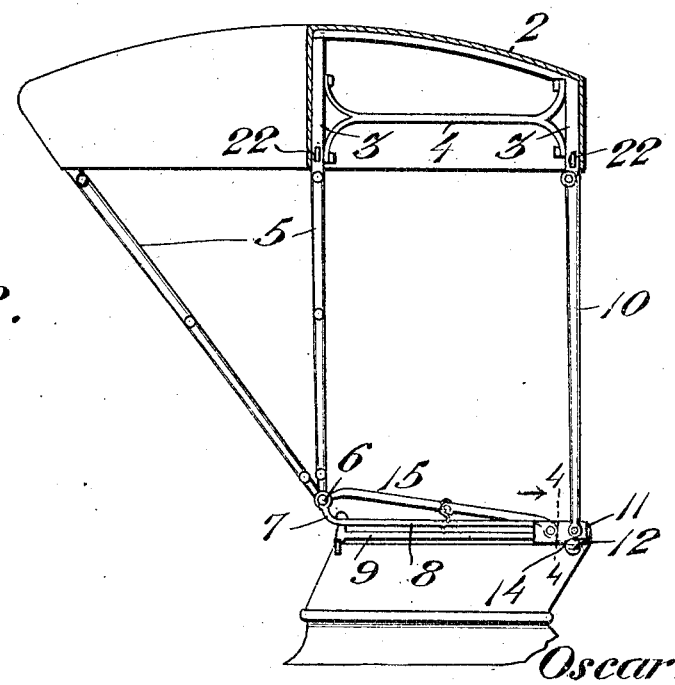

With the above and other objects in view, the invention consists in the construction, combination and arrangement of parts hereinafter fully described, claimed and illustrated in the accompanying drawings, wherein:

Figure 1 is a side elevation of a vehicle top constructed in accordance with my invention. Fig. 2 is a similar view, a portion of the hood of the top being in section and the side curtains removed. Fig. 3 is a similar view illustrating the manner in which the top is lowered. Fig. 4 is a section on the line 4—4 of Fig. 2, looking in the direction indicated by the arrow. Fig. 5 is a detail perspective of the block.

Referring to the drawings by reference-numerals, 2 designates the hood, 3 the transverse ribs which are braced by a member 4, and 5 the side bars of a vehicle top constructed in accordance with my invention. The side bars are connected to or form a part of the front and center transverse ribs 3, and they are pivotally connected to pintles 6 carried by the upwardly bent ends 7 of the upper of a pair of rails 8—9, which are secured to the side frames of the vehicle seat. The rails 8—9 are secured in parallel and spaced relation to each other and to the side frames of the seat by any means suitable for the purpose. Pivotally secured to the rear transverse ribs 3 are levers 10, which are spaced a sufficient distance from the rear side bars 5 to permit the carrier to "route" mail boxes without lowering the vehicle top.

The lower ends of the levers 10 are pivotally secured to blocks 11 which are slidably mounted between the rails 8—9, and which when moved in a forward direction lower the top and which when moved in a rearward direction raise the top, this being permitted by interposing the levers 10 between the blocks and the rear transverse ribs 3. The levers 10 rest upon stops 12 when the top is lowered, which stops are secured to the rear ends of the lower rails 9. The blocks 11 are provided in their upper and lower surfaces with longitudinally extending grooves 13, which receive, respectively, the rails 8—9. A portion of the blocks is removed, as at 14, to prevent the stops from interfering with the sliding of the blocks in rearward directions.

Each of a pair of toggle levers 15 has one of its ends pivotally connected to one of the pintles 6 and its other end pivotally connected to one of the blocks 11, and provides means by which the block may be moved to lower or raise the top. By exerting upward pressure upon the levers 15, the blocks 11 are moved forwardly. These movements of the blocks carry the lower ends of the levers 10 in a forward direction and thereby lower the top. By exerting downward pressure upon the levers 15, the blocks 11 are moved rearwardly. These movements of the blocks move the lower ends of the lever 10 in a rearward direction and thereby raise the top. It should be thus apparent that the vehicle top may be readily and quickly lowered and raised by the rider.

The side curtain 19 is secured to the side bars 5 in the usual manner, while the side curtain 20 is secured in position to prevent it from interfering with the lowering and raising of the top. A rod 21 is removably carried by a pair of alined eyes which are secured to the center and rear transverse ribs 3, between the hood and the lining, while a bar 23 is removably carried by the stop 12 and an eye 24, said eye being secured to and projecting laterally from the front end of the rail 9. The front eyes and front ends of rods 21 and 23 are provided with threads so that nuts are not required. The side curtain 20 is provided with rings 26 mounted upon the bars 21 and 23, and buttons at the rear to the leather back stay in the usual way. The front edge is stiffened with a strip of wood in the hem and attached by a leather strap to a button on the inside of rear side bar 5. By unbuttoning from side bar 5, curtain 20 may be slipped rearward, giving easy access to boxes.

From the foregoing description taken in connection with the accompanying drawings, the construction and mode of operation of the invention will be understood without a further extended description.

Changes in the form, proportions and minor details of construction may be made within the scope of the invention without departing from the spirit or sacrificing any of the advantages thereof.

Having thus fully described and illustrated my invention, what I claim is:

1. The combination with a pivotally mounted vehicle top, of a slidably mounted block, and a lever pivotally secured to the top and the block, the movement of said block lowering and raising the top.

2. The combination with a pivotally mounted vehicle top, of a slidably mounted block, a lever pivotally connected to the top and block, and means by which said block may be moved to lower and raise the top.

3. The combination with a pivotally mounted vehicle top, of a slidably mounted block, a lever pivotally connected to the top and block, and a lever by which the block may be moved to lower and raise the top.

4. The combination with a pivotally mounted vehicle top, of a slidably mounted block, a lever pivotally connected to the top and the block, a lever connected to the block, and another lever connected to a stationary pivot, said levers being hingedly connected together.

5. The combination with a pivotally mounted vehicle top, of a rail, a block slidably mounted on said rail, and a lever connected to the top and the block, the movement of the block lowering or raising the vehicle top.

6. The combination with a pivotally mounted vehicle top, of a rail, a block slidably mounted upon said rail, a lever pivotally connected to the top and the block, a lever pivotally connected to the rail, and a lever pivotally connected to the block, said last named levers being hingedly connected together.

7. The combination with a pivotally mounted vehicle top, of a pair of rails, said rails being secured in parallel and spaced relation to each other, a block slidably mounted between the rails, and a lever connected to the top and the block, the movement of the block lowering or raising the vehicle top.

8. The combination with a pivotally mounted vehicle top, of a slidably mounted block, a lever connected to the top and the block, the movement of the block lowering or raising the vehicle top, a rod carried by the top, another rod carried independently of the top, and a side curtain carried by said rods.

In testimony whereof, I affix my signature in presence of two witnesses.

OSCAR SUTTON.

Witnesses:
JAMES H. EDGERTON,
BENJAMIN HERRING.